(12) United States Patent
Alduino et al.

(10) Patent No.: US 7,782,921 B2
(45) Date of Patent: Aug. 24, 2010

(54) INTEGRATED OPTICAL DETECTOR IN SEMICONDUCTOR REFLECTOR

(75) Inventors: Andrew C. Alduino, San Jose, CA (US); Mario J. Paniccia, Santa Clara, CA (US); Rami Cohen, Kfar-Adumim (IL); Assia Barkai, Jerusalem (IL); Ansheng Liu, Cupertino, CA (US)

(73) Assignee: Intel Corporation, Santa Clara, CA (US)

( * ) Notice: Subject to any disclaimer, the term of this patent is extended or adjusted under 35 U.S.C. 154(b) by 341 days.

(21) Appl. No.: 11/092,059

(22) Filed: Mar. 28, 2005

(65) Prior Publication Data
US 2006/0215726 A1 Sep. 28, 2006

(51) Int. Cl.
*H01S 5/00* (2006.01)

(52) U.S. Cl. ............... 372/50.21; 372/43.01; 372/50.1; 372/99; 372/108; 257/114; 257/458; 257/E33.076

(58) Field of Classification Search .......... 372/43, 372/50.1, 108, 43.01, 50.21, 99; 385/15, 385/49; 257/114, 458, E33.076
See application file for complete search history.

(56) References Cited

U.S. PATENT DOCUMENTS

| | | | |
|---|---|---|---|
| 4,297,653 A | | 10/1981 | Scifres et al. |
| 4,366,377 A | * | 12/1982 | Notthoff et al. ............ 257/446 |
| 4,857,982 A | * | 8/1989 | Forrest .................... 257/186 |
| 4,882,478 A | * | 11/1989 | Hayashi et al. ......... 250/214.1 |
| 4,897,711 A | | 1/1990 | Blonder et al. |
| 5,559,331 A | * | 9/1996 | McKee ................... 250/338.1 |
| 5,611,008 A | | 3/1997 | Yap |
| 5,671,315 A | | 9/1997 | Tabuchi et al. |
| 5,848,211 A | * | 12/1998 | Yang et al. ................ 385/93 |
| 5,936,729 A | * | 8/1999 | Igushi .................... 356/336 |
| 5,987,202 A | | 11/1999 | Gruenwald et al. |
| 6,257,772 B1 | | 7/2001 | Nakanishi et al. |
| 6,435,734 B2 | | 8/2002 | Okada et al. |
| 6,869,299 B2 | | 3/2005 | Tanaka et al. |
| 6,879,397 B2 | * | 4/2005 | Lloyd .................... 356/336 |

(Continued)

FOREIGN PATENT DOCUMENTS

DE 44 11 380 A1 10/1995

(Continued)

OTHER PUBLICATIONS

Swe et al "Design and Optimization of Novel High Responsivity, Wideband Silicon Photodiode" The Japan Society of Applied Physics. vol. 40 (2001) pp. 2738-2740.*

(Continued)

*Primary Examiner*—Minsun Harvey
*Assistant Examiner*—Yuanda Zhang
(74) *Attorney, Agent, or Firm*—Blakely, Sokoloff, Taylor & Zafman LLP

(57) ABSTRACT

An electrical-optical coupling and detecting device. An apparatus according to an embodiment of the present invention includes a reflective surface defined on semiconductor material. The reflective surface is to reflect an incident optical beam towards an optical destination. An optical detector is monolithically integrated in the reflective surface of the semiconductor material. The optical detector arranged in the reflective surface of the semiconductor material is to detect the incident optical beam.

20 Claims, 7 Drawing Sheets

U.S. PATENT DOCUMENTS

| | | | |
|---|---|---|---|
| 6,987,906 B2* | 1/2006 | Nakama et al. | 385/31 |
| 7,106,980 B2 | 9/2006 | Nakanishi et al. | |
| 2002/0175339 A1 | 11/2002 | Raj et al. | |
| 2002/0181853 A1 | 12/2002 | Ido et al. | |
| 2003/0099273 A1* | 5/2003 | Murry et al. | 372/108 |
| 2003/0118288 A1* | 6/2003 | Korenaga et al. | 385/49 |
| 2004/0017977 A1* | 1/2004 | Lam et al. | 385/49 |
| 2005/0100264 A1* | 5/2005 | Kim et al. | 385/14 |
| 2005/0249462 A1* | 11/2005 | Alduino et al. | 385/49 |
| 2005/0253132 A1* | 11/2005 | Marshall et al. | 257/24 |

FOREIGN PATENT DOCUMENTS

| | | |
|---|---|---|
| EP | 0 331 331 A2 | 9/1989 |
| EP | 0 611 975 A1 | 8/1994 |
| EP | 0 836 105 A1 | 4/1998 |
| JP | 08 234063 A | 9/1996 |
| WO | WO 02/077691 A2 | 10/2002 |
| WO | PCT/US2005/014971 | 10/2005 |
| WO | PCT/US2006/011132 | 7/2006 |

OTHER PUBLICATIONS

Encyclopedia of Laser Physics and Technology, http://www.rp-photonics.com/photodiodes.html.*

Iwase, M., et al., "Single Mode Fiber MT-RJ SFF Transceiver Module Using Optical Subassembly With a New Shielded Silicon Optical Bench," IEEE Transactions on Advanced Packaging, vol. 24, No. 4, (Nov. 2001), pp. 419-428.

Wong, Y. et al., "Technology Development of a High-Density 32-Channel 16-Gb/s Optical Data Link for Optical Interconnection Applications for the Optoelectronic Technology Consortium (OETC)," Journal of Lightwave Technology, vol. 13, No. 6, (Jun. 1995), pp. 995-1016.

Strandman, C., et al., "Fabrication of 45° Mirrors Together with Well-Defined V-Grooves Using Wet Anisotropic Etching of Silicon," Journal of Microelectromechanical Systems, vol. 4, No. 4, (Dec. 1995), pp. 213-219.

Akahori, Y. et al., "High-Speed Photoreceivers Using Solder Bumps and Microstrip Lines Formed on a Silicon Optical Bench," IEEE Photonics Technology Letters, vol. 11, No. 4, (Apr. 1999), pp. 454-428.

Delpiano, F., et al., "10-Channel Optical Transmitter Module Operating Over 10 Gb/s Based on VCSEL and Hybrid Integrated Silicon Optical Bench," 1999 Electrical Components and Technology Conference, Torino (Italy), pp. 759-762.

Park, S., et al., "A Novel Method for Fabrication of a PLC Platform for Hybrid Integration of an Optical Module by Passive Alignment," IEEE Photonics Technology Letters, vol. 14, No. 4, (Apr. 2002), pp. 486-488.

Written Opinion of the International Searching Authority, PCT Application No. PCT/US2006/011132, Mar. 24, 2006.

PCT International Preliminary Report on Patentability With Written Opinion of the International Searching Authority, PCT Application No. PCT/US2006/011132, Oct. 3, 2007.

PCT International Preliminary Report on Patentability With Written Opinion of the International Searching Authority, PCT Application No. PCT/US2005/014971, Nov. 7, 2006.

* cited by examiner

INTEGRATED OPTICAL DETECTOR IN SEMICONDUCTOR REFLECTOR

BACKGROUND OF THE INVENTION

1. Field of the Invention

The present invention relates generally to optical devices and, more specifically, the present invention relates to optical detectors.

2. Background Information

Copper based electrical interconnects are commonly used when connecting electrical devices over short distances because copper based electrical interconnects are simple, cheap, well understood and reliable. However, as interconnect bandwidth requirements continue to increase, bandwidth limitations for copper based electrical interconnects on printed circuit boards (PCB) increase due to issues such as signal attenuation, electromagnetic interference (EMI) and crosstalk.

Lasers are well known devices that emit light through stimulated emission and produce coherent light beams with a frequency spectrum ranging from infrared to ultraviolet and may be used in a vast array of applications. In optical communications or networking applications, semiconductor lasers may be used to produce light or optical beams on which data or other information may be encoded and transmitted.

BRIEF DESCRIPTION OF THE DRAWINGS

The present invention is illustrated by way of example and not limitation in the accompanying figures.

DETAILED DESCRIPTION

Methods and apparatuses providing an optical detector monolithically integrated in and/or around an optical reflector defined in semiconductor material are disclosed. In the following description numerous specific details are set forth in order to provide a thorough understanding of the present invention. It will be apparent, however, to one having ordinary skill in the art that the specific detail need not be employed to practice the present invention. In other instances, well-known materials or methods have not been described in detail in order to avoid obscuring the present invention.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner in one or more embodiments.

Figure 1:
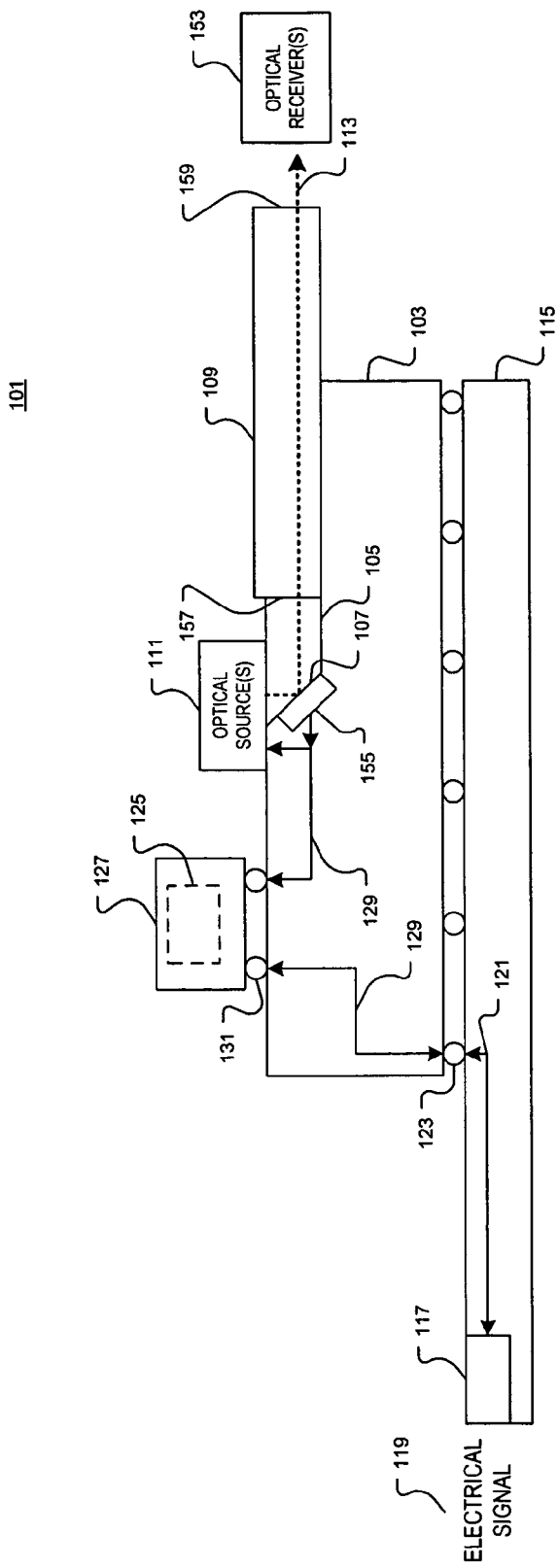
FIG. 1 is a diagram illustrating a cross-section of one embodiment of a coupling device including an integrated optical detector in accordance with the teachings of the present invention.

FIG. 1 is a diagram that shows a cross-section of one embodiment of a coupling device 101 including an embodiment of an optical detector 155 monolithically integrated in and/or around an optical reflector 107 in accordance with the teachings of the present invention. As shown in the depicted embodiment, coupling device 101 includes a first trench 105 that is defined in semiconductor material 103. In one embodiment, semiconductor material 103 is a silicon semiconductor substrate which may be packaged with a C4 ball grid array or the like. As shown in the depicted embodiment, optical reflector 107 is defined at a first end of the first trench 105 in semiconductor material 103. In one embodiment, the optical reflector 107 is angled with respect to an axis of the first trench 105. For example, in the illustrated embodiment, optical reflector 107 is shown to be illustrated at approximately 45 degrees with respect to the axis of first trench 105 such that optical reflector 107 reflects or redirects an incident optical beam in accordance with the teachings of the present invention.

In one embodiment, a first end 157 of an optical fiber 109 is disposed in the first trench 105. In one embodiment, first trench 105 is a trench or groove that is etched or defined in semiconductor material 103 as for example a V-groove, U-groove, or the like such that the first end 157 of optical fiber 109 is passively aligned in trench 105 when optical fiber 109 is disposed or received in trench 105.

As shown in the depicted embodiment, an optical source 111 is mounted to semiconductor material 103 and/or is located proximate to optical reflector 107 in the first trench 105. In one embodiment, optical source 111 is includes a laser, such as for example a vertical cavity surface-emitting lasers (VCSEL) or other suitable optical source. In one embodiment, optical source 111 outputs an optical beam 113 such that the first end 157 of optical fiber 109 is an optical destination of optical beam 113 directed from optical source 111 and reflected from optical reflector 107 according to an embodiment of the present invention. In another embodiment, optical source 111 may be one of a plurality or an array of optical sources and may output one or more optical beams. In yet another embodiment, a plurality of trenches 105 are defined in semiconductor material 103, a corresponding optical fiber 109 is disposed in each respective trench 105 and a corresponding optical source 111 is disposed proximate to a corresponding trench 105 such that an optical beam 113 is transmitted through each respective optical fiber 109.

As shown in the embodiment of FIG. 1, an optical detector 155 is included in semiconductor material 103 in accordance with the teachings of the present invention. In one embodiment, optical detector 155 is an active device that is monolithically integrated during fabrication in the optical reflector 107 of semiconductor 103 to detect optical beam 113. Detection of optical beam 113 using an embodiment of optical detector 155 enables functions such as optical power monitoring of optical beam 113 or for example measuring the extinction ratio of optical beam 113 in accordance with the teachings of the present invention. In another embodiment that includes a plurality of optical sources 111 and trenches 105, a plurality of respective optical detectors 155 may be monolithically integrated in optical reflector 107 to individually detect, monitor or measure the respective optical beam 113 in accordance with the teachings of the present invention. Individual detection and monitoring of each optical beam 113, allows for individual control of the driving currents to compensate for device non-uniformity, temperature variation, lifetime variation, etc. in accordance with the teachings of the present invention.

As shown in the embodiment of FIG. 1, semiconductor material 103 is mounted on a printed circuit board (PCB) 115. In one embodiment, PCB is made of a glass fiber epoxy laminate such as for example an FR4 material or other suitable material. In one embodiment, PCB 115 includes contacts 117 which are electrically coupled to semiconductor material 103. In one embodiment, contacts 117 are electrically coupled to semiconductor material 103 through conductors 121 and solder bumps 123 or other suitable electrical connections. In one embodiment, contacts 117 are arranged on PCB 115 so as to provide an edge connector, which in one embodiment is coupled to receive or transmit an electrical signal 119.

In the illustrated embodiment, coupling device 101 further includes a circuit 125 included in semiconductor material 127, which in one embodiment is a silicon semiconductor substrate mounted to semiconductor material 103. As shown in the depicted embodiment, circuit 125 is electrically coupled to optical source 111, optical detector 155 and PCB 115 through conductors 129 and contacts 131. In one embodiment, circuit 125 includes circuitry such as for example complementary metal oxide semiconductor (CMOS) drivers and/or control circuitry to monitor optical detector 155 and drive and/or control optical source 111 accordingly.

In one embodiment, circuit 125 is coupled to receive electrical signal 119 and aid optical source 111 in performing an electrical-optical conversion from electrical signal 119 to the appropriate power levels of optical beam 113. In one embodiment, circuit 125 also monitors with optical detector 155 the power or extinction ratio of optical beam 113 reflected from optical reflector 107 and controls optical beam 113 in response. In so doing, optical source 111 outputs optical beam 113 in response to electrical signal 119 and/or feedback received from optical detector 155 regarding monitored optical beam 113. In one embodiment optical beam 113 is directed from optical source 111 to reflector 107, which is defined in semiconductor material 103 at end of trench 105. Optical beam 113 is then directed from reflector 107 to an optical target, which is illustrated in FIG. 1 as the first end 157 of optical fiber 109. In one embodiment, an optical receiver 153 is optically coupled to the other end 159 of optical fiber 109 to receive optical beam 113.

Although coupling device 101 is illustrated in the example embodiment of FIG. 1 with one optical source 111, one trench 105 and one optical fiber 109, it is appreciated that in another embodiment, a plurality of corresponding optical sources 111, optical detectors 155, trenches 105 and optical fibers 109 may be included in coupling device 101. The monolithically integrated optical detectors 155 in optical reflectors 107 can individually detect, monitor or measure each respective optical beam 113 in accordance with the teachings of the present invention. Individual detection and monitoring of each optical beam 113, allows for individual control of the driving currents to compensate for device non-uniformity, temperature variation, lifetime variation, etc. in accordance with the teachings of the present invention.

Figure 2:
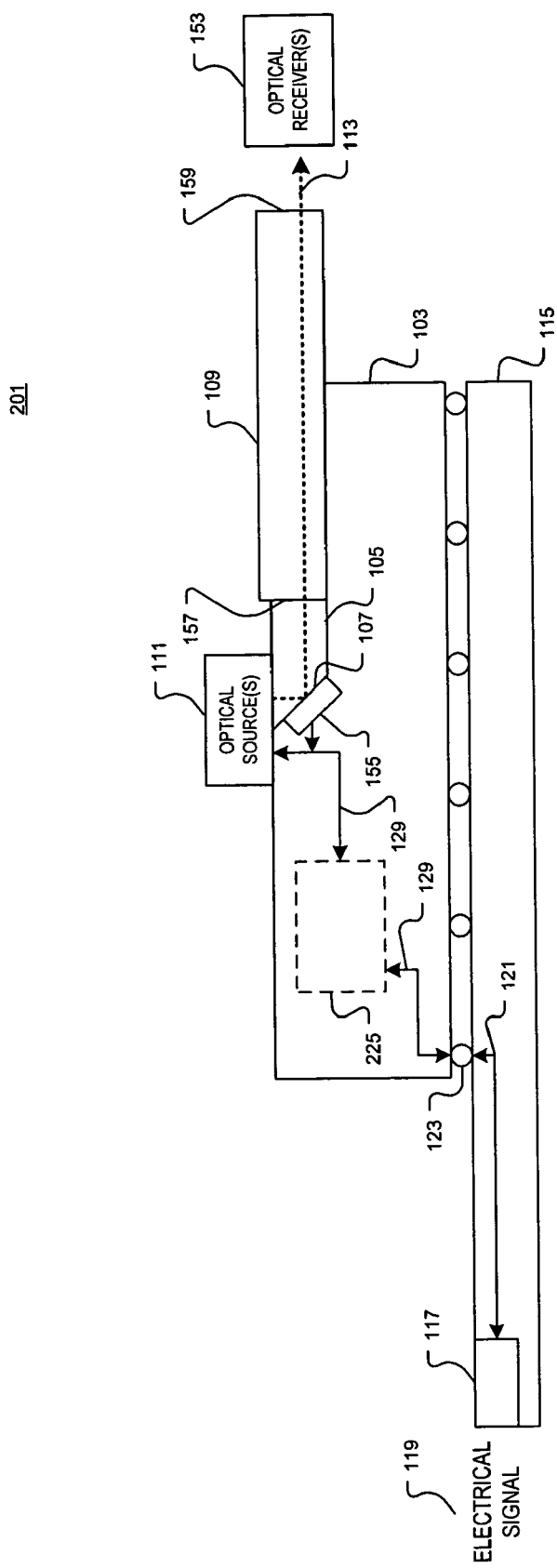
FIG. 2 is a diagram illustrating a cross-section of another embodiment of a coupling device including an integrated optical detector in accordance with the teachings of the present invention.

FIG. 2 is a diagram illustrating a cross-section of another embodiment of a coupling device 201 in accordance with the teachings of the present invention. The embodiment of coupling device 201 illustrated in FIG. 2 shares similarities to the embodiment of coupling device 101 illustrated in FIG. 1. For instance, as shown in the FIG. 2, coupling device 201 includes first trench 105 defined in semiconductor material 103. First reflector 107 is defined in first trench 105 in semiconductor material 103. First optical fiber 109 is disposed in first trench 105. In one embodiment, optical fiber 109 is passively aligned in trench 105 when optical fiber 109 is disposed or received in trench 105.

In one embodiment, optical source 111 is mounted to semiconductor material 103 such that the optical source 111 is optically coupled to first optical fiber 109 via the first reflector 107. In one embodiment, optical source 111 outputs optical beam 113 to optical fiber 109 via reflector 107. In another embodiment, optical source 111 may be one of a plurality or an array of optical sources and may output one or more optical beams. In yet another embodiment, a plurality of trenches 105 are defined in semiconductor material 103, a corresponding optical fiber 109 is disposed in each respective trench 105 and a corresponding optical source 111 is disposed proximate to a corresponding trench 105 such that an optical beam 109 is transmitted through each respective optical fiber 109. As shown in the depicted embodiment of FIG. 2, an optical detector 155 is included in semiconductor material 103 and is an active device that is monolithically integrated during fabrication in the optical reflector 107 of semiconductor 103 to detect optical beam 113.

In one embodiment, semiconductor material 103 is mounted on a PCB 115. In one embodiment, PCB 115 includes contacts 117 which are electrically coupled to semiconductor material 103 through conductors 121 and solder bumps 123. In one embodiment, contacts 117 provide a connector, which in one embodiment is coupled to receive and/or transmit electrical signal 119. In one embodiment, coupling device 201 further includes a circuit 225, which is included semiconductor material 103. In the illustrated embodiment, circuit 225 is monolithically integrated directly into the same semiconductor material that includes monolithically integrated optical detector 155 in accordance with the teachings of the present invention. As shown in the embodiment shown in FIG. 2, circuit 225 is electrically coupled between optical source 111 and PCB 115 through conductors 129 and contacts 123. In one embodiment, circuit 225 includes circuitry to drive and/or control optical device 211 in response to electrical signal 119 and/or feedback received from optical detector 155.

Figure 3:
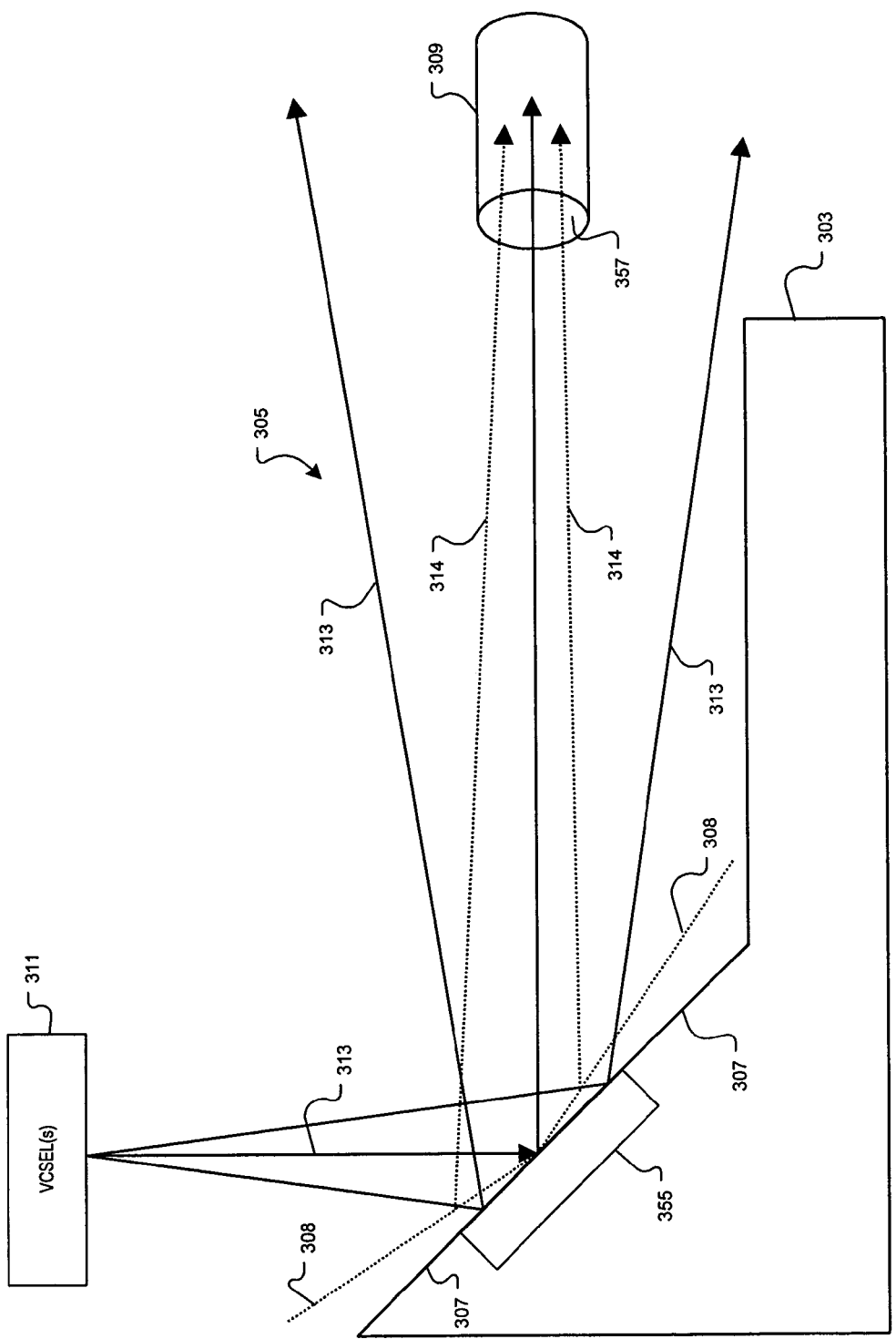
FIG. 3 is a diagram illustrating an embodiment of an optical source optically coupled to an optical fiber via various embodiments of reflectors including an integrated optical detector in accordance with the teachings of the present invention.

FIG. 3 is a diagram illustrating an embodiment of an optical source 311 optically coupled to an optical fiber 309 via a reflector 307 or 308 including a monolithically integrated optical receiver 355 in greater detail accordance with the teachings of the present invention. As shown in the depicted embodiment, trench 305 is defined in semiconductor material 303. In one embodiment, a reflector 307, which is substantially planar, is defined at the end of trench 305. In another embodiment, a reflector 308, which has a curvature or is non-planar, is defined at the first end of trench 305. In one embodiment, a reflective material, such as for example a metalization and/or other suitable material, is patterned on reflector 307 or 308 to improve the reflectivity of reflector 307 or 308.

As shown in the depicted embodiment, an optical fiber 309 is disposed in trench 305 at a second end of trench 305. In one embodiment, trench 305 is defined in semiconductor material 303 such that optical fiber 309 is passively aligned with trench 305 when optical fiber 309 is disposed in trench 309. In one embodiment, an optical source 311, such as for example a VCSEL, directs optical beam 313 to reflector 307 or 308, which is then directed from reflector 307 or 308 to an optical target 357, which is an end of optical fiber 309. As shown, optical detector 355 is monolithically integrated in the optical reflector 307 or 308 of semiconductor 303 to detect and/or monitor optical beam 313. As shown in the embodiment of FIG. 3, the optical beams 313 and/or 314 that are reflected from reflectors 307 and/or 308, respectively, are directed into optical fiber 309 in accordance with the teachings of the present invention. In one embodiment, the non-planar shape of reflector 308 helps to focus more of optical beam 314 into the optical target located at the end 357 of optical fiber 309 to reduce optical coupling loss in accordance with the teachings of the present invention.

In the embodiment shown in FIG. 3, it is noted that optical beam 313 is illustrated as being directed through trench 305 through free space. In other embodiments, it is noted that trench 305 may optionally include one or more of a lens and/or a waveguide and/or other suitable optical elements to optically couple optical source 311 and optical fiber 309.

Figure 4A:
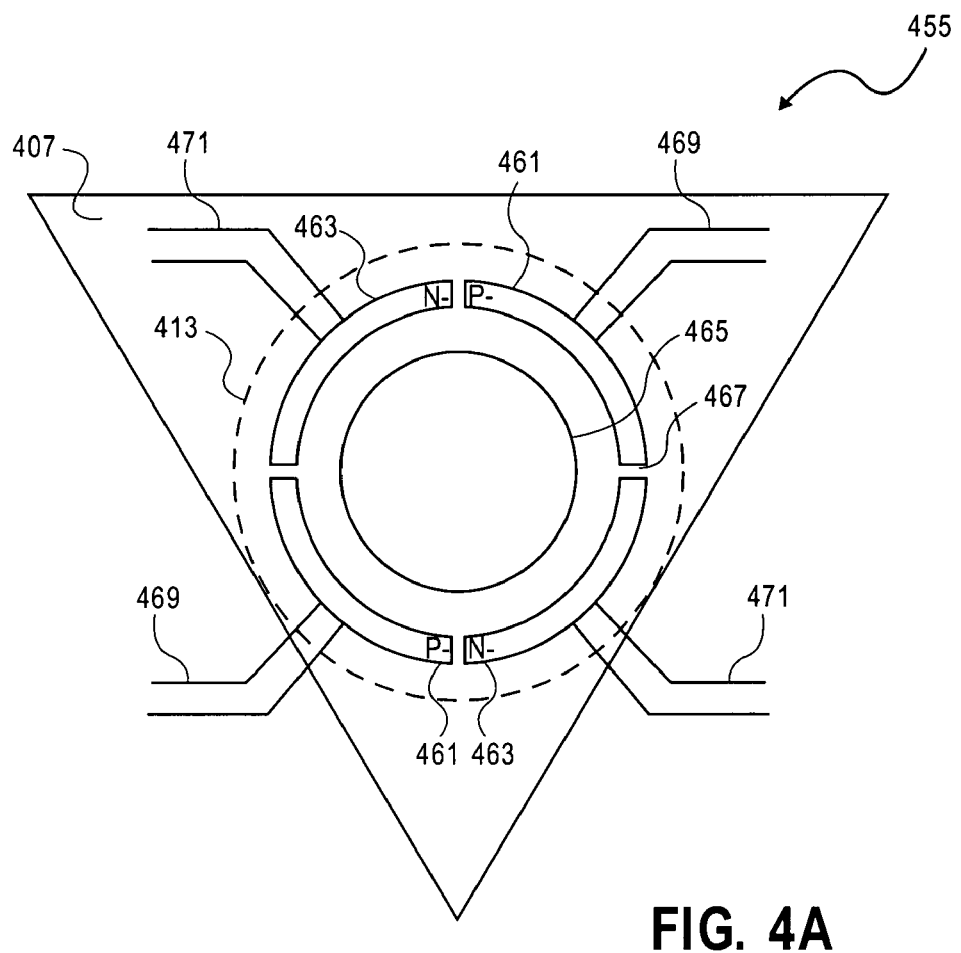
FIG. 4A is a diagram illustrating an embodiment of an optical detector monolithically integrated in and/or around an optical reflector defined in a semiconductor material in accordance with the teachings of the present invention.

FIG. 4A is a diagram illustrating an embodiment of an optical detector monolithically integrated in an optical reflector 407 defined in semiconductor material in accordance with the teachings of the present invention. In one embodiment, optical reflector 407 is shown as having a V-shape due to the V-groove formed by the trench in the semiconductor material. In the embodiment depicted in FIG. 4A, optical detector 455 includes a photodetector that includes a P-type doped region 461 and an N-type doped region 463 defined in semiconductor material having high resistivity in accordance with the teachings of the present invention. Contacts 469 are shown as being electrically coupled to P-type doped regions 461 and contacts 471 are shown as being electrically coupled to N-type doped regions 463. In one embodiment, contacts 469 and 471 are electrically coupled to for example conductors 129 in FIGS. 1 and 2 and provide coupling to circuit 125 or 225 in accordance with the teachings of the present invention.

Figure 4B:
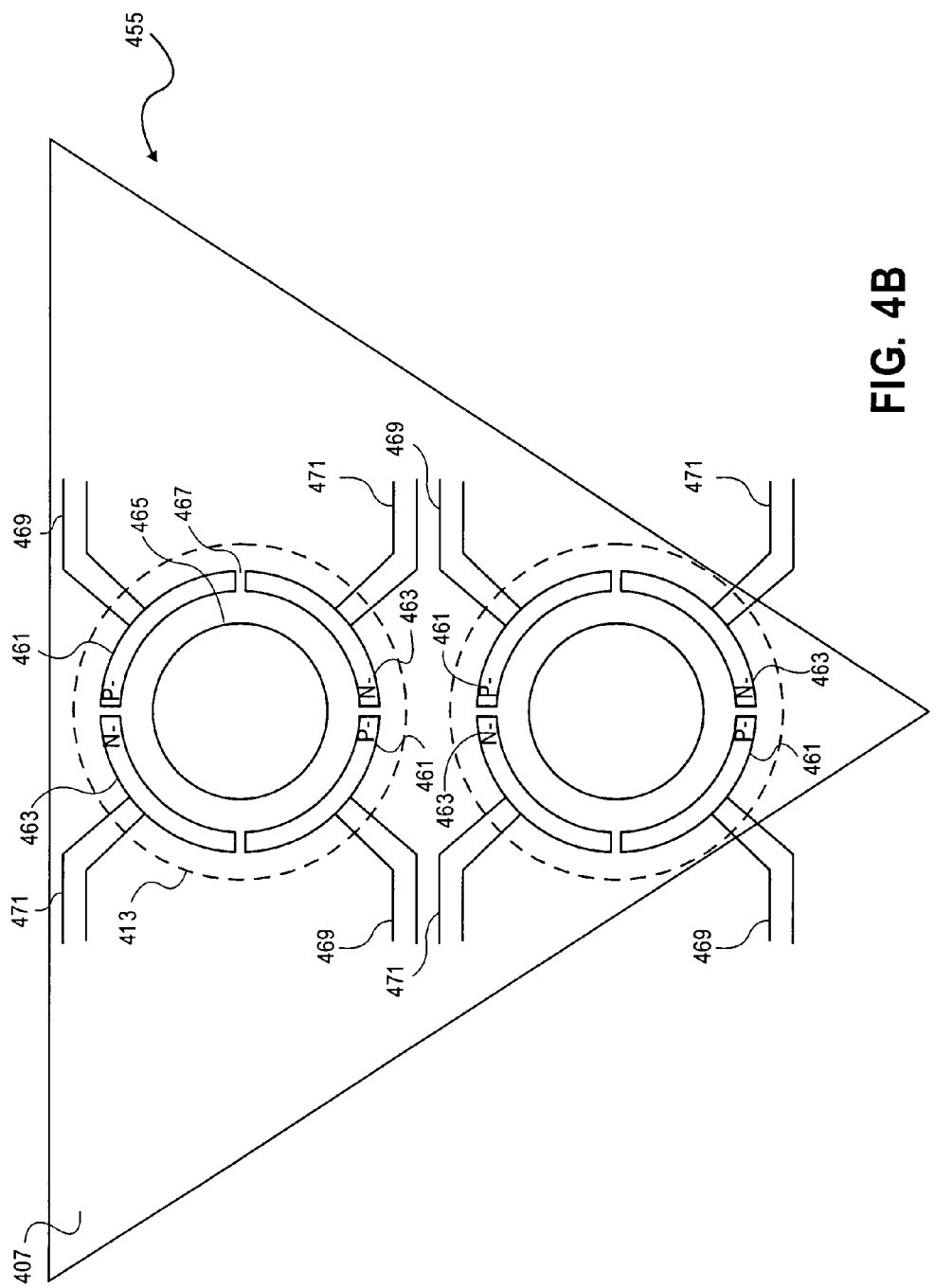
FIG. 4B is a diagram illustrating an embodiment of a plurality of optical detectors monolithically integrated in and/or around an optical reflector defined in a semiconductor material in accordance with the teachings of the present invention.

In the example shown in FIG. 4A, the P-type and N-type doped regions 461 and 463 are located in an absorbing region 467 arranged in an outer region around a central region of the photodetector. During operation, the photodetector is illuminated with incident optical beam 413 such that the central region is towards the center of the spot of optical beam 413 while the absorbing region is located towards the outer regions of the spot of optical beam 413 reflected from optical reflector 407. In one embodiment, the central region of the photodetector includes a reflective material 465, which may include for example sputtered gold or another suitably reflective material. The reflective properties of the central portion including reflective material 465 help to provide low loss optical coupling from the optical source 111 into the optical fiber 109, while the outer absorbing regions 467 incorporate the detector function of optical detector 455 in accordance with the teachings of the present invention. As illustrated in FIG. 4B, in other embodiments various and other orientations and arrangements of the p-type and n-type absorbing regions, as well as the reflector and electrodes, are possible in accordance with the teachings of the present invention. Depending upon the characteristics of the embodiment, the optical intensity profile of optical beam 413 might be even more desirable than that shown in the example in FIG. 4A in accordance with the teachings of the present invention.

Figure 5:
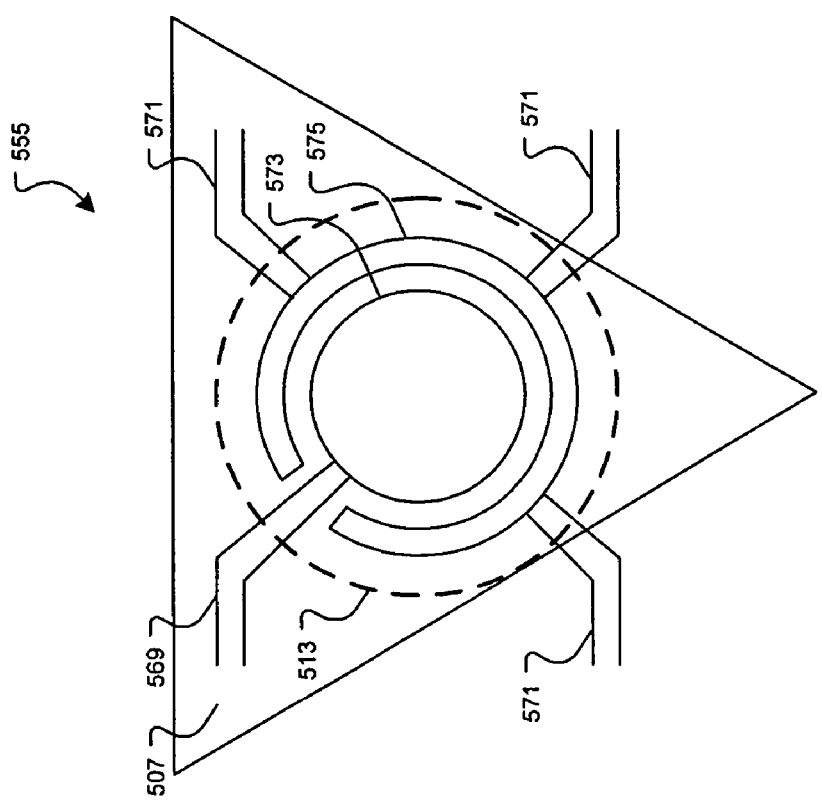
FIG. 5 is a diagram illustrating another embodiment of an optical detector monolithically integrated in and/or around an optical reflector defined in semiconductor material in accordance with the teachings of the present invention.

FIG. 5 is a diagram illustrating another embodiment of an optical detector 555 monolithically integrated in an optical reflector 507 defined in semiconductor material in accordance with the teachings of the present invention. In the embodiment depicted in FIG. 5, optical detector 555 includes a photodetector that includes a metal-semiconductor-metal (MSM) type photodetector. In particular, the photodetector includes a central metal region 573 surrounded by an outer metal region 575 disposed in the semiconductor material of optical detector 555 in accordance with the teachings of the present invention. Contacts 569 and 571 are shown as being electrically coupled to the metal regions 573 and 575 to provide electrical coupling to for example conductors 129 in FIGS. 1 and 2 to provide coupling to circuit 125 or 225 in accordance with the teachings of the present invention. In one embodiment, metal 573 and metal 575 are made of Ti/Au or other materials which provide a Schottky barrier between metal and semiconductor. During operation, the photodetector is illuminated with incident optical beam 513 such that the central metal region 573 is towards the center of the spot of optical beam 513 while the outer metal region 575 is located towards the outer regions of the spot of optical beam 513 reflected from optical reflector 507. In one embodiment, the metal regions 573 and 575 of the photodetector are reflective to help to provide low loss optical coupling from the optical source 111 into the optical fiber 109 in accordance with the teachings of the present invention. It is noted that in other embodiments, various and other orientations and arrangements of the p-type and n-type absorbing regions, as well as the reflector and electrodes, are possible in accordance with the teachings of the present invention. Depending upon the characteristics of the embodiment, the optical intensity profile of optical beam 513 might be even more desirable than that shown in the example in FIG. 5 in accordance with the teachings of the present invention.

Figure 6:
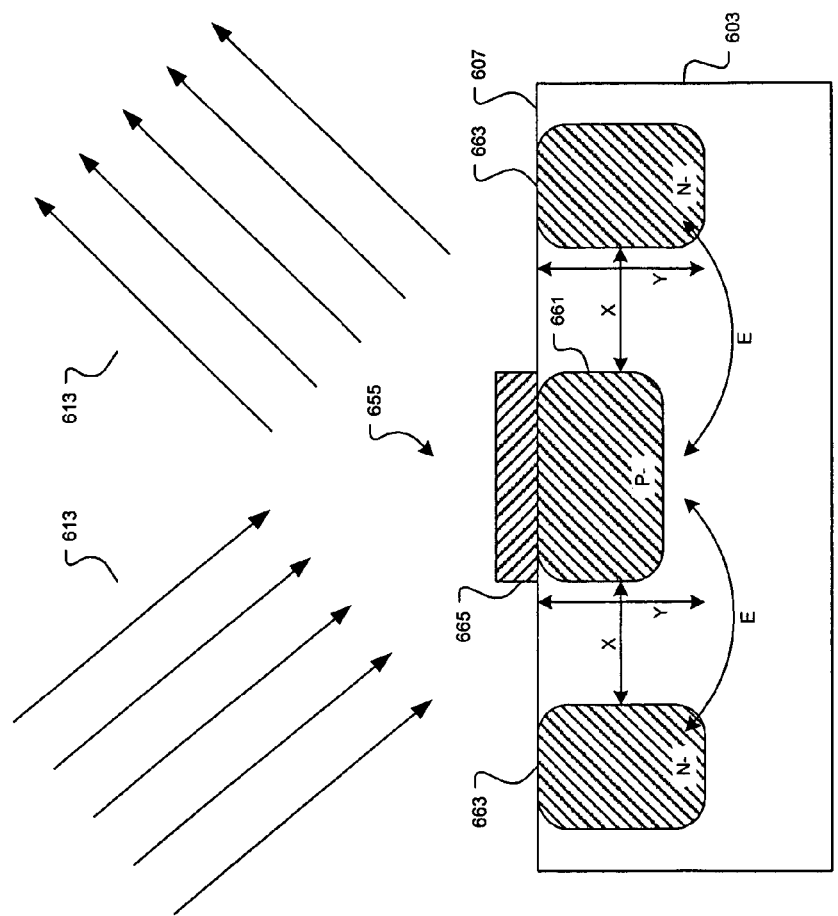
FIG. 6 is a diagram illustrating a cross-section illustration of an optical detector monolithically integrated in and/or around an optical reflector defined in a semiconductor material in accordance with the teachings of the present invention.

FIG. 6 is a diagram illustrating a cross-section illustration of yet another embodiment of an optical detector 655 including a photodetector monolithically integrated in an optical reflector 607 defined in semiconductor material 603 in accordance with the teachings of the present invention. As shown in the depicted embodiment, a P-type doped region 661 is disposed in a central region of the photodetector surrounded by an N-type doped region 663 defined towards outer regions of the photodetector. In one embodiment, N-type doped region 663 may be a single doped region or multiple doped regions defined in high resistivity semiconductor material in a ring arrangement surrounding P-type doped region 661. In the illustrated embodiment, a reflector material 665 is illustrated as being patterned over the central region of the photodetector on the reflective surface of the optical reflector 607. Accordingly, incident optical beam 613 is reflected from the reflective surface of the optical reflector 607 while optical beam 613 is detected and/or monitored by the photodetector in accordance with the teachings of the present invention. In another embodiment, it is noted that the polarity of the P-type and N-type doped regions 661 and 663 may be reversed in accordance with the teachings of the present invention.

In the illustrated embodiment, the P-type and N-type doped regions 661 and 663 are separated in the semiconductor material 603 by a distance of X. The photo absorption depth of optical beam 613 is illustrated as Y and the electric field between the P-type and N-type doped regions 661 and 663 is illustrated as E in FIG. 6. In one embodiment, the speed of optical detector 655 is determined or influenced by factors including X and Y. In one embodiment, X is approximately 20

µm and Y is approximately 850 nm in accordance with the teachings of the present invention.

In the foregoing detailed description, the method and apparatus of the present invention have been described with reference to specific exemplary embodiments thereof. It will, however, be evident that various modifications and changes may be made thereto without departing from the broader spirit and scope of the present invention. The present specification and figures are accordingly to be regarded as illustrative rather than restrictive.

What is claimed is:

1. An apparatus, comprising:
   a reflective surface defined on semiconductor material, the reflective surface to reflect an incident optical beam towards an optical destination; and
   an optical detector monolithically integrated in the reflective surface of the semiconductor material and arranged in the reflective surface of the semiconductor material to detect the incident optical beam, wherein the optical detector comprises four approximately 90-degree arcs positioned substantially along the circumference of a single circle surrounding a reflective central region, the plurality of open arcuate regions having alternating conductivity types.

2. The apparatus of a claim 1 further comprising a vertical cavity surface-emitting laser to generate the incident optical beam.

3. The apparatus of claim 1 wherein the semiconductor material comprises a silicon substrate included in an integrated circuit chip.

4. The apparatus of claim 1 further comprising an optical fiber located at the optical destination.

5. The apparatus of claim 4 wherein the optical fiber is disposed in a V-groove defined in the semiconductor material.

6. The apparatus of claim 1 wherein the plurality of open arcuate regions are substantively absorbing.

7. The apparatus of claim 1 wherein the reflective surface is substantially planar.

8. The apparatus of claim 1 wherein the reflecting surface is substantially non-planar.

9. The apparatus of claim 1 wherein the optical detector is one of a plurality of optical detectors monolithically integrated in the semiconductor material wherein each of the plurality of optical detectors is located on a respective reflective surface to individually detect a respective one of a plurality optical beam incident thereon and reflected therefrom.

10. A method, comprising:
    directing an optical beam towards a semiconductor material;
    substantially reflecting the optical beam from a reflective surface defined in the semiconductor material;
    detecting the optical beam incident on the reflective surface defined in the semiconductor material with a photodetector monolithically integrated in the reflective surface of the semiconductor material, wherein the photodetector comprises four approximately 90-degree arcs positioned substantially along the circumference of a single circle surrounding a reflective central region, the plurality of open arcuate regions having alternating conductivity types; and
    directing the optical beam reflected from the semiconductor material to an optical destination.

11. The method of claim 10 further comprising monitoring a power of the optical beam received from an optical source with the photodetector monolithically integrated in the reflective surface of the semiconductor material.

12. The method of claim 10 further comprising measuring an extinction ratio of a signal generated by an optical source generating the optical beam with the photodetector monolithically integrated in the reflective surface of the semiconductor material.

13. The method of claim 10 wherein directing the optical beam reflected from the semiconductor material comprises focusing the optical beam with the reflective surface into the optical destination.

14. A system, comprising:
    an optical source to generate an incident optical beam;
    a reflective surface defined on semiconductor material, the reflective surface to reflect the incident optical beam received from the optical source;
    an optical detector monolithically integrated in the reflective surface of the semiconductor material, and arranged in the reflective surface of the semiconductor material to detect the incident optical beam, wherein the optical detector comprises four approximately 90-degree arcs positioned substantially along the circumference of a single circle surrounding a reflective central region, the plurality of open arcuate regions having alternating conductivity types;
    an optical fiber disposed in the semiconductor material, the reflective surface to reflect the incident optical beam received from the optical source into one end of the optical fiber; and
    an optical receiver optically coupled to another end of the optical fiber to receive the optical beam.

15. The system of claim 14 wherein the optical source comprises a vertical cavity surface-emitting laser.

16. The system of claim 14 further comprising an integrated circuit included in the semiconductor material and coupled to the optical detector, the integrated circuit coupled to receive an electric signal from the photodetector to detect the optical beam.

17. The system of claim 14 further comprising an integrated circuit included in a semiconductor substrate separate from the semiconductor material and electrically coupled to the optical detector, the integrated circuit coupled to receive an electric signal from the photodetector to detect the optical beam.

18. The apparatus of claim 1 wherein the open arcuate regions are non-contiguous and are positioned at different circumferential locations along the single circle.

19. The method of claim 10 wherein the open arcuate regions are non-contiguous and are positioned at different circumferential locations along the single circle.

20. The system of claim 14 wherein the open arcuate regions are non-contiguous and are positioned at different circumferential locations along the single circle.

* * * * *